E. ERICKSON.
STOP MOTION.
APPLICATION FILED DEC. 13, 1915.

1,205,722.

Patented Nov. 21, 1916.

Inventor:
Edward Erickson,
by Walter E. Lombard, Atty.

UNITED STATES PATENT OFFICE.

EDWARD ERICKSON, OF CLIFTONDALE, MASSACHUSETTS, ASSIGNOR TO VICTOR SHOE MACHINERY COMPANY, OF LYNN, MASSACHUSETTS, A CORPORATION OF MASSACHUSETTS.

STOP-MOTION.

1,205,722.    Specification of Letters Patent.    Patented Nov. 21, 1916.

Application filed December 13, 1915. Serial No. 67,071.

*To all whom it may concern:*

Be it known that I, EDWARD ERICKSON, a subject of the King of Sweden, and a resident of Cliftondale, in the county of Essex and State of Massachusetts, have invented certain new and useful Improvements in Stop-Motions, of which the following is a specification.

This invention relates to stop motions for power driven machines, and has for its object the provision of means whereby the machine may always be stopped at substantially the same point preparatory to another operation.

The invention consists of certain novel features of construction and arrangement of parts which will be fully understood by reference to the description of the drawings and to the claims hereinafter given.

Figure 1:
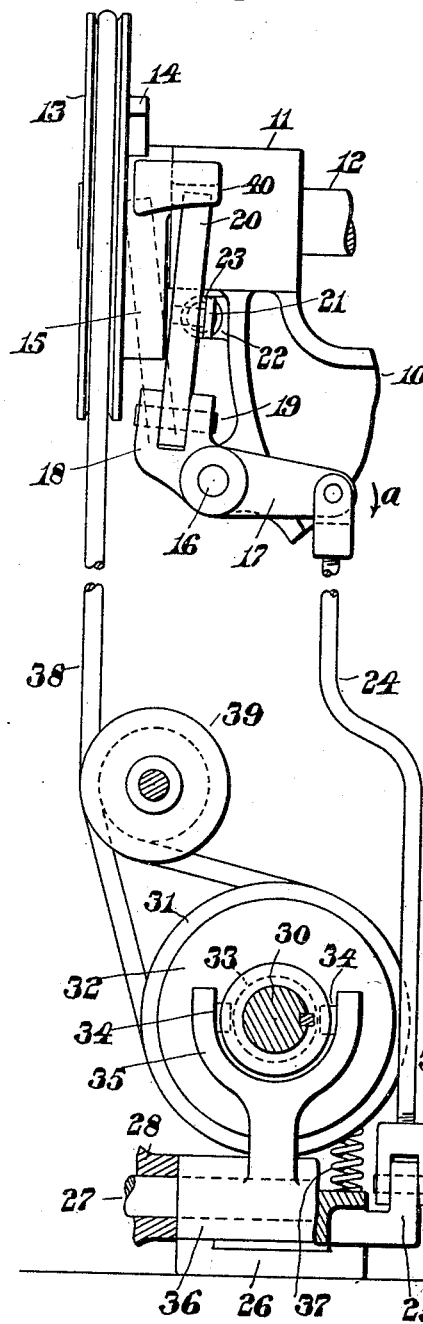
Figure 2:
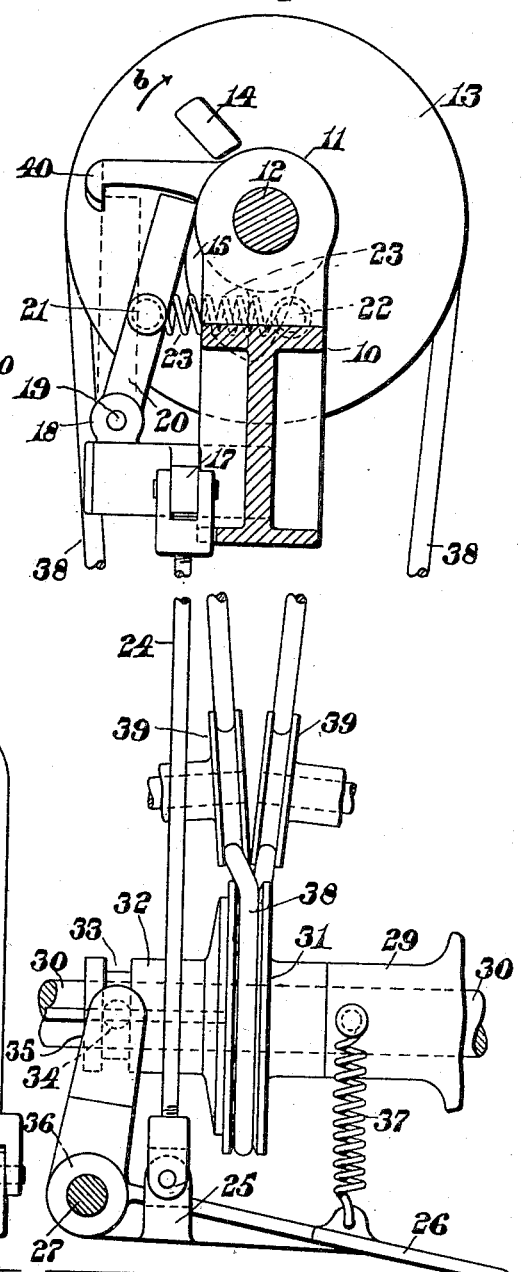

Of the drawings: Figure 1 represents a rear elevation of a stop motion embodying the principles of the present invention, and Fig. 2 represents a vertical section of the same.

Similar characters designate like parts throughout the figures of the drawings.

In the drawings, 10 is a portion of the frame of a power driven machine, such, for instance, as a sewing machine. The frame 10 is provided with a bearing 11 in which is mounted a revoluble shaft 12 having secured to one end thereof a driving member 13. This driving member 13 has extending from one face a stop lug 14 and a cam projection 15. At 16 a lever 17 is pivoted to the frame 10, this lever 17 having a forked arm 18 provided with a pivot member 19, the axis of which is perpendicular to the axis of the pivot 16. On the pivot member 19 is mounted an arm 20 having intermediate its length a stud 21 between which and a fixed stud 22 on the frame 10 is interposed a helical spring 23. This spring 23 normally retains the arm 20 in contact with the periphery of the bearing 11. The outer end of the lever 17 has pivotally connected thereto a connector 24 the lower end of which is pivotally connected to an ear 25 projecting from the treadle 26 mounted on the shaft 27 in any suitable bearing 28.

The frame 10 of the machine is provided with a bearing 29 in which is mounted the driving shaft 30 having loosely mounted thereon the driving pulley 31 and keyed thereto the clutch member 32, the face of which is adapted to be forced into frictional contact with the adjacent face of the pulley 31 to drive the latter. The clutch member 32 is provided with an annular groove 33 into which projects the studs 34 of the forked arm 35 projecting upwardly from the hub 36 of the treadle 26.

Between the bearing 29 and the treadle 26 is interposed a spring 37 which normally retains the clutch member 32 separated from the driving pulley 31. The pulley 31 is provided with a belt 38 passing partially around intermediate pulleys 39 to the driving member 13. When the operator is depressing the treadle 26 the clutch member 32 will be moved into contact with the driving pulley 31 and impart a rotary movement thereto, this rotary movement being transmitted through the belt 38 to the driving member 13 on the revoluble shaft 12. The downward movement of the treadle 26 will also cause the lever 17 to be moved in the direction of the arrow $a$ on Fig. 1 of the drawings, thus moving the arm 20 out of the path of the stop lug 14 and cam projection 15 as they rotate about the axis of the shaft 12 with the driving member 13. As long as the operator continues to depress the treadle 26 the machine will continue to operate. As soon, however, as the operator removes his foot from the treadle 26 the spring 37 will raise the treadle 26 and cause the clutch member 32 to be removed from contact with the driving pulley 31, and consequently no more power will be transmitted to the revoluble shaft 12. The driving member 13, however, will have considerable momentum, and it is desirable that its rotation should be stopped as soon as possible with the revoluble shaft in position for a subsequent operation.

It is obvious that when the spring 37 raises the treadle 26 it will simultaneously raise a connecting rod 24 and move the lever 17 about its pivot 16, thus throwing the arm 20 into the position shown in dotted lines in Fig. 1 of the drawing, and when in this position it is in the path of the stop lug 14 and cam projection 15, and as the driving member 13 continues to rotate in the direction of the arrow $b$ on Fig. 2 of the drawings, the cam projection 15 will come into contact with the arm 20 and move it outwardly into the position shown in dotted lines in Fig. 2 of the drawings, outward movement of said arm about its pivot 19 being limited by a fixed stop shoulder 40 projecting from the bearing 11.

As the arm 20 is moved outwardly about its pivot 19 the stretching of the spring 23 will gradually increase the tension thereon so that the momentum of the driving pulley 13 will be gradually decreased and under ordinary conditions brought to a full stop. When the tension of the spring 23 is insufficient to stop the rotation of the driving member 13 the arm 20 will be moved into contact with the shoulder 40 when the further rotation of the pulley 13 will be suddenly stopped. In either case the tendency would be for the pulley 13 to kick back in the opposite direction to the arrow *b* on Fig. 2 of the drawings. When this reverse movement occurs the stop lug 14 comes into contact with the upper end of the arm 20 and prevents any further movement in the reverse direction. By this means the driving pulley 13 is always brought to a stop within certain limits and in a position to commence another operation of the machine.

It is believed that the operation and many advantages of the invention will be fully understood from the foregoing description.

Having thus described my invention, I claim:

1. In a device of the class described, the combination of a revoluble shaft; driving means thereon; a stop lug projecting from a side face thereof; a cam projection on the same face of said driving means; a pivoted lever; an arm pivoted at one end to said lever and normally in the path of said projection; resilient means for moving said arm toward said shaft; and mechanism for moving said lever about its pivot and said arm from the path of said cam projection.

2. In a device of the class described, the combination of a revoluble shaft; driving means thereon; a stop lug projecting from a side face thereof; a cam projection on the same face of said driving means; a pivoted lever; an arm pivoted at one end to said lever and normally in the path of said projection; resilient means for moving said arm toward said shaft; a fixed shoulder to limit the outward movement of said arm; and mechanism for moving said lever about its pivot and said arm from the path of said cam projection.

3. In a device of the class described, the combination of a revoluble shaft; driving means thereon; a stop lug projecting from a side face thereof; a cam projection on the same face of said driving means; a pivoted lever; an arm pivoted at one end to said lever and normally in the path of said projection with the axis of its pivot perpendicular to the axis of said lever pivot; resilient means for moving said arm toward said shaft; and mechanism for moving said lever about its pivot and said arm from the path of said cam projection.

4. In a device of the class described, the combination of a revoluble shaft; driving means thereon; a stop lug projecting from a side face thereof; a cam projection on the same face of said driving means of greater length from the axis of said revoluble shaft than the length of said stop lug; a pivoted lever; an arm pivotally mounted thereon and normally in the path of said projection; resilient means for moving said arm toward said shaft; and mechanism for moving said lever about its pivot and said arm from the path of said cam projection.

5. In a device of the class described, the combination of a revoluble shaft; driving means thereon; a stop lug projecting therefrom; a cam projection on said driving means; a pivoted lever; an arm pivotally mounted thereon adapted to move in a plane perpendicular to the plane of movement of said lever and normally in the path of said cam projection; resilient means for moving said arm toward said shaft; a spring for moving said arm about its pivot and normally retaining said arm in the path of said stop lug; and mechanism for moving said lever about its pivot and said arm from the path of said cam projection.

6. In a device of the class described, the combination of a revoluble shaft; driving means thereon; a stop lug projecting from a side face thereof; a cam projection on the same face of said driving means; a pivoted lever; an arm pivotally mounted thereon and normally in the path of said projection; resilient means for moving said arm toward said shaft; a treadle; a connector between said treadle and lever; and a spring for moving said arm about its pivot and normally retaining said arm in the path of said stop lug.

7. In a device of the class described, the combination of a revoluble shaft; a driving pulley thereon; a stop member projecting therefrom; a cam projection on said driving pulley; a pivoted lever; an arm pivotally mounted on said lever; a spring normally retaining said arm against the face of said pulley; another spring for moving said arm toward said shaft; a driving shaft; a pulley loosely mounted thereon; a belt connecting said pulleys; a revoluble clutch member adapted to engage said loose pulley and impart rotary movement thereto; and treadle mechanism for throwing said clutch member into engagement with said loose pulley and simultaneously moving said arm from the path of said cam projection.

8. In a device of the class described, the combination of a revoluble shaft; a driving member thereon provided on one side face with a stop lug and a cam projection; an arm with its end normally retained in the path of said lug and between it and said cam projection; and means actuated by the machine starting device for moving the free end of said arm in a direction parallel to said shaft from the path of said lug and projection during the operation of the machine and subsequently returning it to its normal position.

9. In a device of the class described, the combination of a revoluble shaft; a driving member thereon provided on one side face with a stop lug and a cam projection; an arm with its end normally retained in the path of said lug and between it and said cam projection, said arm being supported to move in vertical planes perpendicular to each other; and means actuated by the machine starting device for removing said arm from the path of said lug and projection during the operation of the machine and subsequently returning it to its normal position.

10. In a device of the class described, the combination of a revoluble shaft; a driving member thereon provided on one face with a stop lug and a cam projection; an arm with its end normally retained in the path of said lug and between it and said cam projection, said arm being supported to move in vertical planes perpendicular to each other; a spring to move said arm toward said revoluble shaft; a fixed shoulder to limit the outward movement of said arm; and means actuated by the machine starting device for removing said arm from the path of said lug and projection during the operation of the machine and subsequently returning it to its normal position.

Signed by me at Lynn, Mass., this 19th day of October, 1915.

EDWARD ERICKSON.

Witnesses:
 WALTER E. LOMBARD,
 JOHN F. McGOWAN.

Copies of this patent may be obtained for five cents each, by addressing the "Commissioner of Patents, Washington, D. C."